US010177597B2

(12) United States Patent
Message Thebaudeau et al.

(10) Patent No.: US 10,177,597 B2
(45) Date of Patent: Jan. 8, 2019

(54) CONTROL SYSTEM AND METHOD OF CONTROLLING POWER CONSUMPTION OF COMMUNICATIONS IN AN ELECTRIC INFRASTRUCTURE

(71) Applicant: Schneider Electric Industries SAS, Rueil-Malmaison (FR)

(72) Inventors: Laetitia Message Thebaudeau, Dizimieu (FR); Julien Berton, Miribel (FR); Mathieu Lansoy, Bressolles (FR); Guillaume Verneau, Collonges Au Mont d'Or (FR)

(73) Assignee: SCHNEIDER ELECTRIC INDUSTRIES SAS, Rueil-Malmaison (FR)

( * ) Notice: Subject to any disclaimer, the term of this patent is extended or adjusted under 35 U.S.C. 154(b) by 91 days.

(21) Appl. No.: 15/381,729

(22) Filed: Dec. 16, 2016

(65) Prior Publication Data

US 2017/0187237 A1 Jun. 29, 2017

(30) Foreign Application Priority Data

Dec. 24, 2015 (FR) ...................................... 15 63296

(51) Int. Cl.
*H02J 13/00* (2006.01)
*H04W 52/02* (2009.01)

(52) U.S. Cl.
CPC ..... *H02J 13/0017* (2013.01); *H04W 52/0206* (2013.01); *H04W 52/0245* (2013.01); *Y02D 70/00* (2018.01); *Y02D 70/142* (2018.01); *Y02D 70/146* (2018.01)

(58) Field of Classification Search
CPC ........... H02J 13/0017; H04W 52/0206; H04W 52/0245; Y02D 70/146; Y02D 70/142; Y02D 70/00
See application file for complete search history.

(56) References Cited

U.S. PATENT DOCUMENTS

| 7,010,294 | B1 * | 3/2006 | Pyotsia | ................ G05B 19/042 340/3.1 |
| 2003/0124983 | A1 * | 7/2003 | Parssinen | .............. H04W 52/54 455/69 |

(Continued)

OTHER PUBLICATIONS

French Preliminary Search Report dated Oct. 6, 2016 in French Application 15 63296, filed on Dec. 24, 2015 (with English Translation of Categories of Cited Documents).

*Primary Examiner* — Jared Fureman
*Assistant Examiner* — Michael Warmflash
(74) *Attorney, Agent, or Firm* — Oblon, McClelland, Maier & Neustadt, L.L.P.

(57) ABSTRACT

A method and a system of control of power consumption of communications between electrical modules of an electrical infrastructure, including a star-shaped communication network between a central module, or master module, and a set of slave modules, the master module being set up to be connected to the slave modules by non-wireline communications links in a star pattern, and a processing circuit set up to regulate the power levels of communications links at least in a direction of reception by the master module from at least one slave module or by at least one slave module from the master module.

13 Claims, 12 Drawing Sheets

(56) References Cited

U.S. PATENT DOCUMENTS

| | | | |
|---|---|---|---|
| 2005/0275527 A1* | 12/2005 | Kates | G08B 1/08 340/539.22 |
| 2006/0183431 A1* | 8/2006 | Chang | H04B 1/0458 455/69 |
| 2007/0054690 A1 | 3/2007 | Wu et al. | |
| 2007/0115827 A1* | 5/2007 | Boehnke | H04B 7/212 370/236 |
| 2013/0012149 A1* | 1/2013 | Ben Ghalba | H03G 3/3078 455/226.1 |
| 2013/0064116 A1* | 3/2013 | Speight | H04B 7/15528 370/252 |

\* cited by examiner

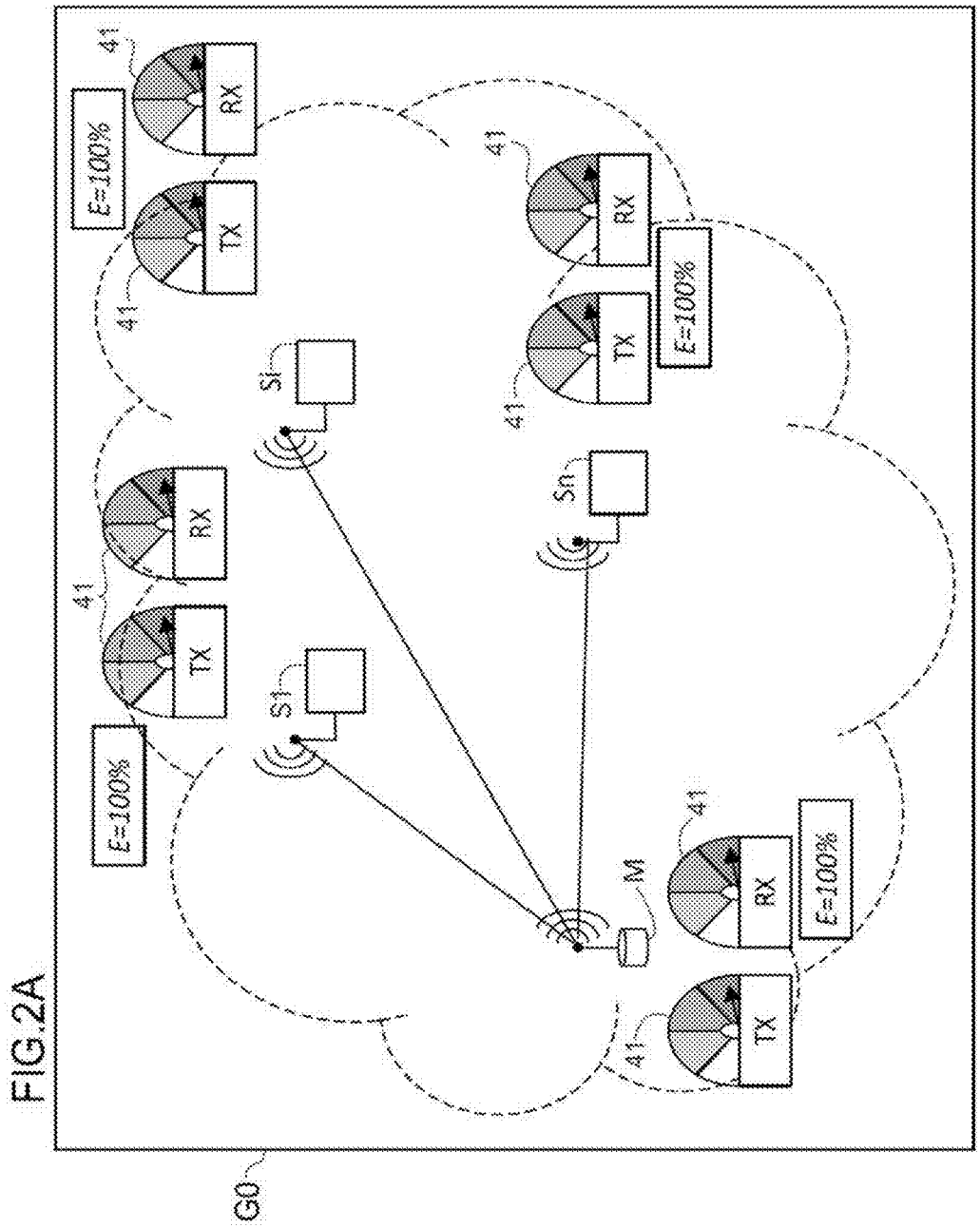

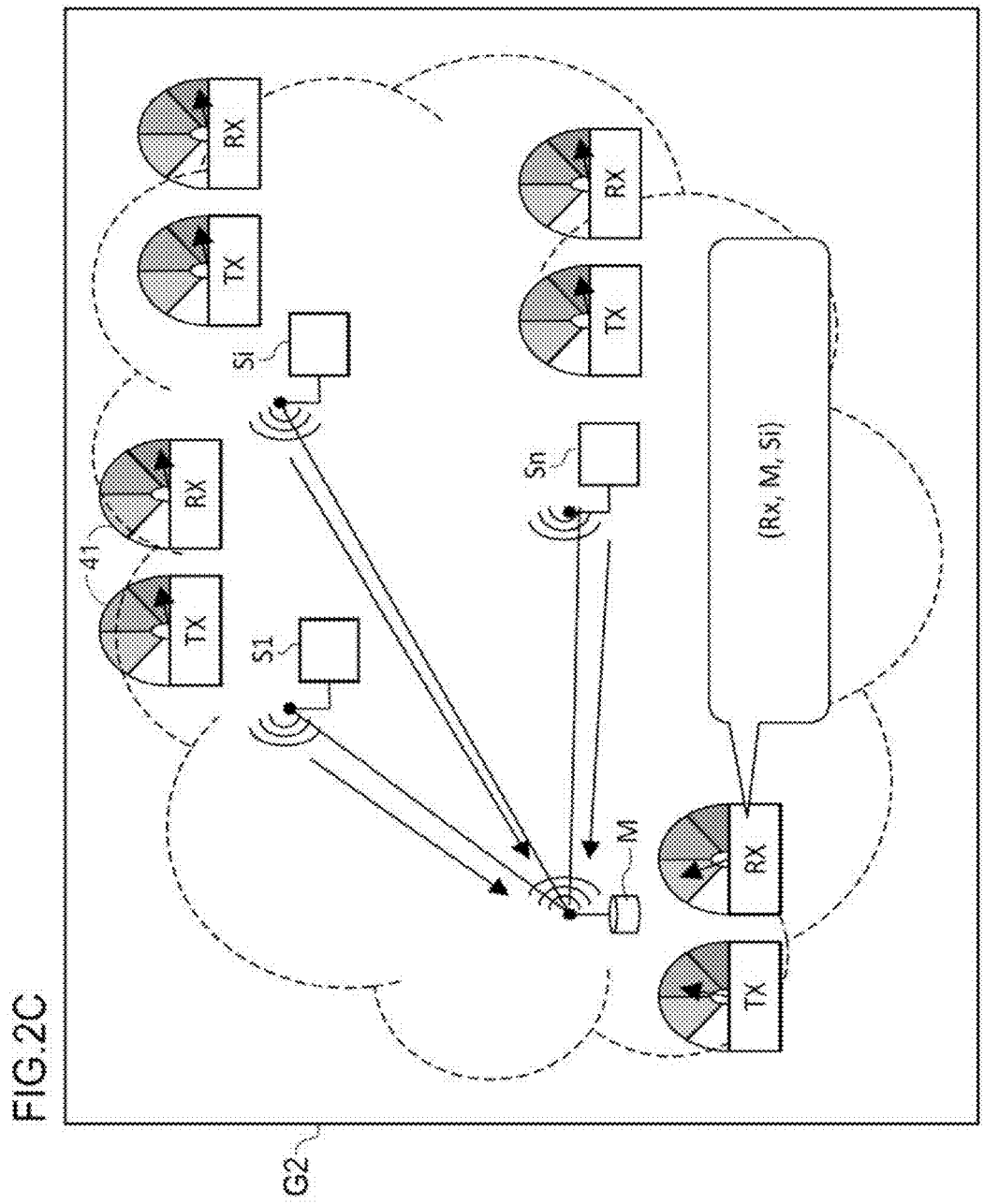

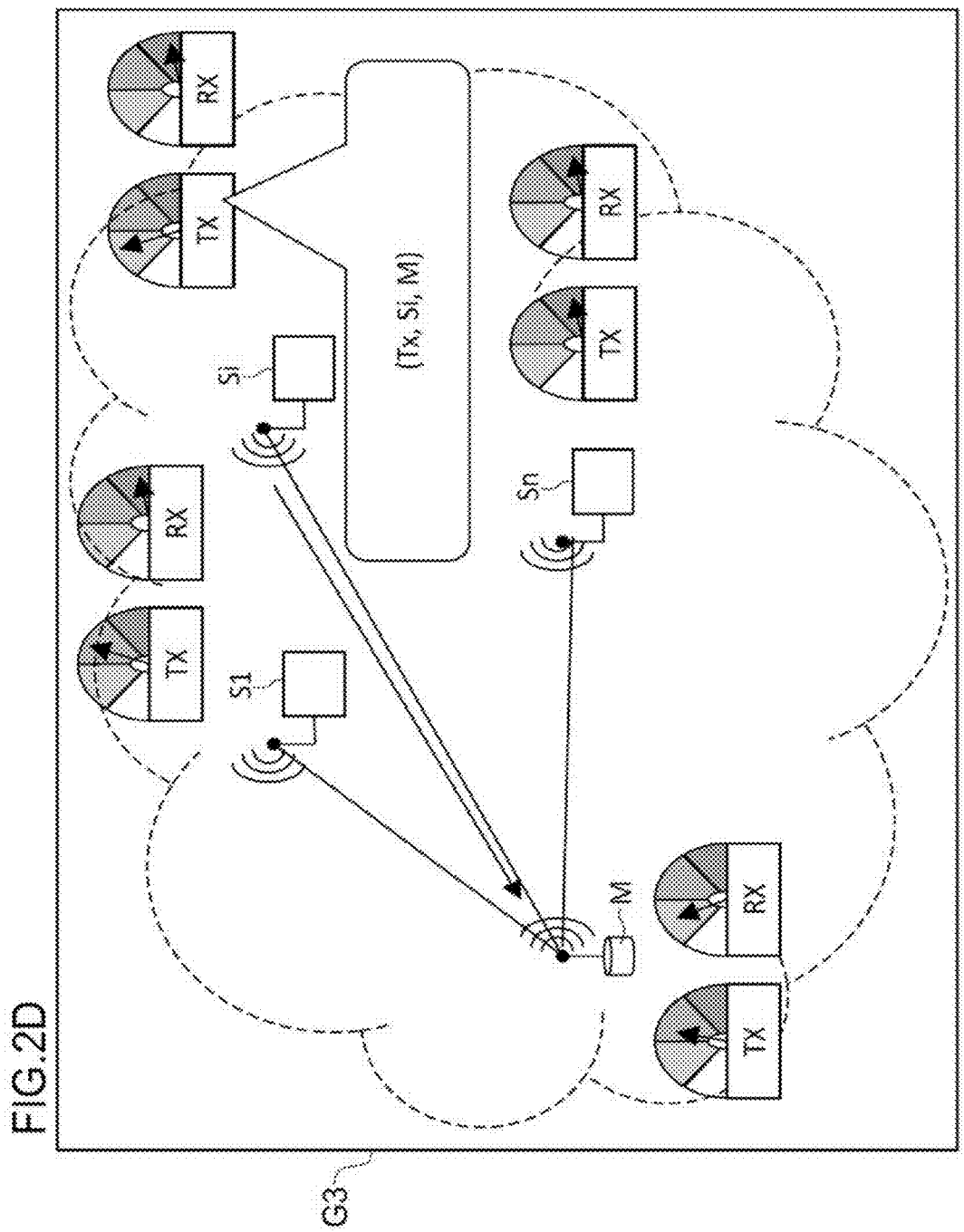

CONTROL SYSTEM AND METHOD OF CONTROLLING POWER CONSUMPTION OF COMMUNICATIONS IN AN ELECTRIC INFRASTRUCTURE

TECHNICAL FIELD

The present invention concerns wireless communication between modules of an electrical infrastructure such as a substation of an electrical distribution network and, more particularly, control of the power consumption of the communications between the modules.

PRIOR ART

In the past, the substations of an electrical distribution network had only a small number of communication options. Generally, these communications were carried out by wireline connections. This necessitates many long wire connections, which is a disadvantage in terms of footprint and cost. Moreover, it is hard to carry out any rearrangement of an architecture of wireline communication.

Moreover, wireline communications were limited to priority functionalities in regard to network security and the safety of persons and property.

At present, more and more substations are equipped with wireless means of communication which do not have the aforementioned drawbacks.

Even so, it turns out that wireless communications are operated without consideration paid to power engineering aspects and they generally operate at full power. In fact, the power consumption of communications in a substation is not negligible and not under control. This can become critical and lead to problems in the event of an interruption in electricity production (blackout) of any length of time, when all of the equipment needs to operate on emergency power supply, such as cells, batteries, or supercapacitors.

Moreover, a poor definition of the management of priorities between wireless communications and functionalities of the substation may possibly disrupt the operations of certain elements such as switches or automatically resetting circuit breakers within the substation.

The purpose of the present invention is thus to propose a method and a system for control of wireless communication making it possible to connect in a secure manner a large number of equipment units while controlling the power consumption of the communications and without having the aforementioned drawbacks.

EXPLANATION OF THE INVENTION

The invention proposes a method of control of power consumption of communications between electrical modules of an electrical infrastructure, involving the following steps:
  definition of a star-shaped communication network by partitioning the electrical modules between a central module, or master module, and a set of slave modules, the master module being set up to be connected to the slave modules by non-wireline communications links in star pattern, and
  regulation of the power levels of communications links at least in a direction of reception by the master module from at least one slave module or by at least one slave module from the master module.

Advantageously, the method involves regulating the power levels of communications links at least in the direction of reception by the master module from each slave module or by each slave module from the master module.

This makes it possible to control the power consumption at least in the direction of reception by the master module and/or by each slave module.

Advantageously, the method involves furthermore regulating the power levels of communications links in a direction of transmission from the master module to at least one slave module or from at least one slave module to the master module.

Advantageously, the method involves furthermore regulating the power levels of communications links in a direction of transmission from the master module to each slave module or from each slave module to the master module.

Thus, the consumption is further optimized by modulating the power devoted to both the reception and the transmission and furthermore relative to each electrical module (master or slave).

Advantageously, the method involves the following steps:
  regulation of the power levels in the direction of transmission from the master module to each slave module,
  regulation of the power levels in the direction of reception of the master module from each slave module,
  regulation of the power levels in the direction of transmission from each slave module to the master module, and
  regulation of the power levels in the direction of reception of each slave module from the master module.

Thus, all the communications between the master module and the slave modules in the two directions of communication (transmission and reception) are taken into account so as to establish the level of consumption which is necessary and sufficient in an individualized manner for each communications link.

Advantageously, the method involves a modelling of communications links by ordered triplets each comprised of a first component indicating the direction of the communications link, and second and third components indicating the starting point and arrival point of the communications link in the forward order or in the inverse order according to whether the direction of communication assigned by the first component is respectively a transmission or a reception. This comes down to assigning to the first component the direction of communication (transmission or reception), to the second component the module which is the subject of the verb of said communication, and to the third component the module which is the object complement of the verb of said communication.

This facilitates the implementing of a generic algorithm for regulation of power as a function of only three parameters (i.e. three components of the ordered triplet).

Advantageously, the regulation of the power level of a generic communications link identified by a first triplet having for its components a first direction of the communications link, a first electrical module, and a second electrical module, is realized according to a generic process involving the following steps:
  definition of a second triplet having as its first component a second direction of the communications link opposite said first direction, as its second component said second electrical module, and as its third component said first electrical module,
  testing in iterative fashion an operating state of the communications link as a function of the first and second current values of regulation of power levels pertaining respectively to said first and second triplets while decrementing for each iteration a counter associated with the current value of regulation pertaining to the first triplet, said counter being initialized at a maximum power level value, saving the first and second current values of regulation of operational power levels, saving a set of functional regulation pairs (j, k) pertaining to the first triplet (DIRECTION, A, B), each current pair of functional regulation being composed of said first and second current values of regulation of operational power levels.

Thus, the same generic algorithm is used to regulate the transmission and the reception at the same time and also for each electrical module, whether master or slave. This considerably simplifies the development of the algorithm and makes it possible to add new functions in simple and quick manner.

Advantageously, the method involves a saving of a power consumption configuration according to a strategy aiming to optimize the power consumption of the first module or the second module or the least power-hungry of said first and second modules.

Advantageously, the method involves a failure analysis of a communication in the event of a malfunctioning of the communications link.

Advantageously, the method involves a regulation in broadcast mode involving the step of selecting, from among the functional pairs associated with the communications links, the maximum level of transmission from the master module to each of the slave modules, as well as the maximum level of reception of the master module from each of the slave modules.

Advantageously, the control of power consumption according to the invention of said master module and said slave modules is carried out after a predetermined event or during a critical situation.

Thus, the minimization of the power consumption of communication can be executed after a predetermined event (for example, the initial installation, or the placing under voltage), or during a critical situation (for example, a failure of communication, an electrical consumption peak, or blackout). This makes it possible to manage critical situations (consumption peak, malfunction, or interruption of the electrical distribution network) according to an order of priority. For example, in the event of a malfunction or a consumption peak, a portion of the available power should be given priority for the proper operation of the electrical installation by lowering the levels of communication to the least possible in order to economize on power. This also makes it possible to manage events which might disrupt operations within the station by lowering the communication levels to a minimum, for example when bypassing a switch in order to avoid any risk or disruption.

The invention likewise concerns a system of control of power consumption of communications between electrical modules of an electrical infrastructure, characterized in that it comprises:

a star-shaped communication network between a central module, or master module, and a set of slave modules, the master module being set up to be connected to the slave modules by non-wireline communications links in a star pattern, and a processing circuit set up to implement the method according to the above features.

According to one embodiment of the invention, the star-shaped communication network is an internal network composed of equipment within the same substation among which a central equipment unit is set up to play the role of the master module while the other equipment units are set up to play the roles of the slave modules.

This allows several equipment units of the same substation to exchange data for the proper operation and safety of the substation.

According to one embodiment of the invention, the star-shaped communication network is an external network composed of a set of electrical substations among which a central substation, or command centre, is set up to play the role of the master module while the other substations are set up to play the roles of the slave modules.

The invention also concerns an electrical infrastructure (substation or electrical distribution network) comprising the system or implementing the method according to any one of the above features.

BRIEF DESCRIPTION OF THE DRAWINGS

Other features and advantages of the invention will appear upon reading the preferred embodiments of the invention making reference to the enclosed figures in which:

FIGS. 2A-2E represent in schematic fashion the global steps of a method for control of the power consumption of communications between electrical modules of an electrical infrastructure, according to a preferred embodiment of the invention;

DETAILED EXPLANATION OF PARTICULAR EMBODIMENTS

Figure 1:
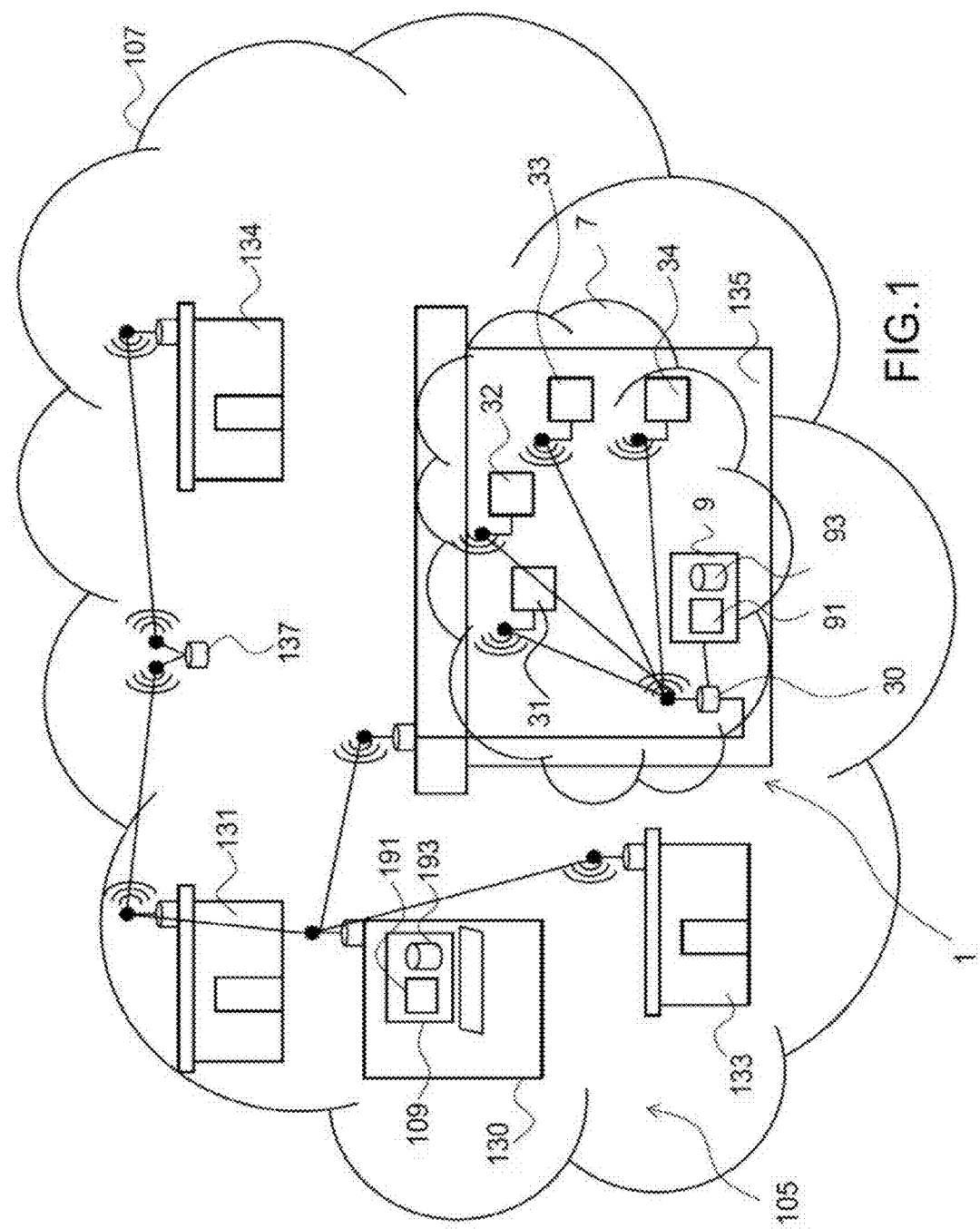
FIG. 1 represents in schematic fashion a system for control of the power consumption of communications between electrical modules of an electrical infrastructure, according to a preferred embodiment of the invention.
Figure 2B:
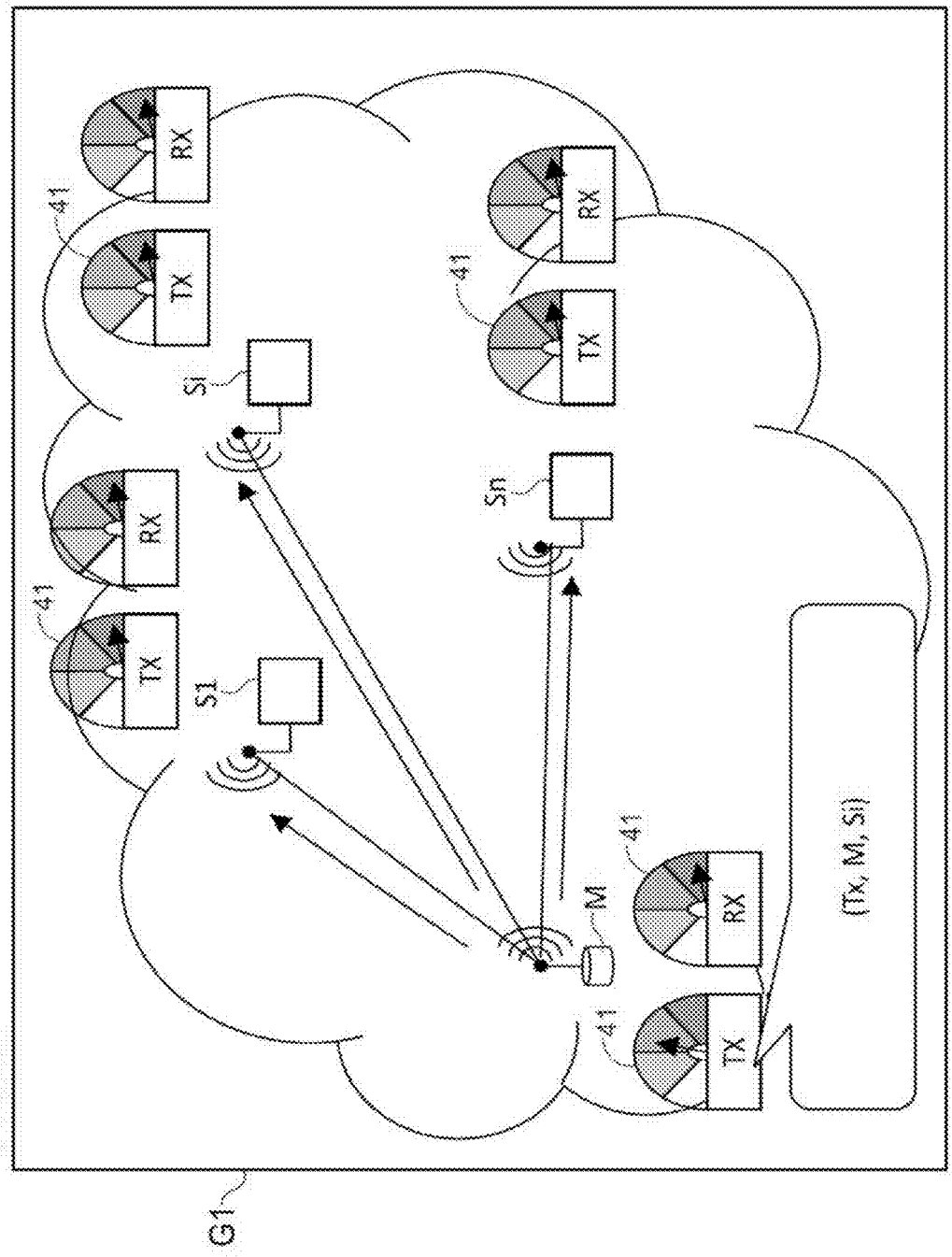
Figure 2E:
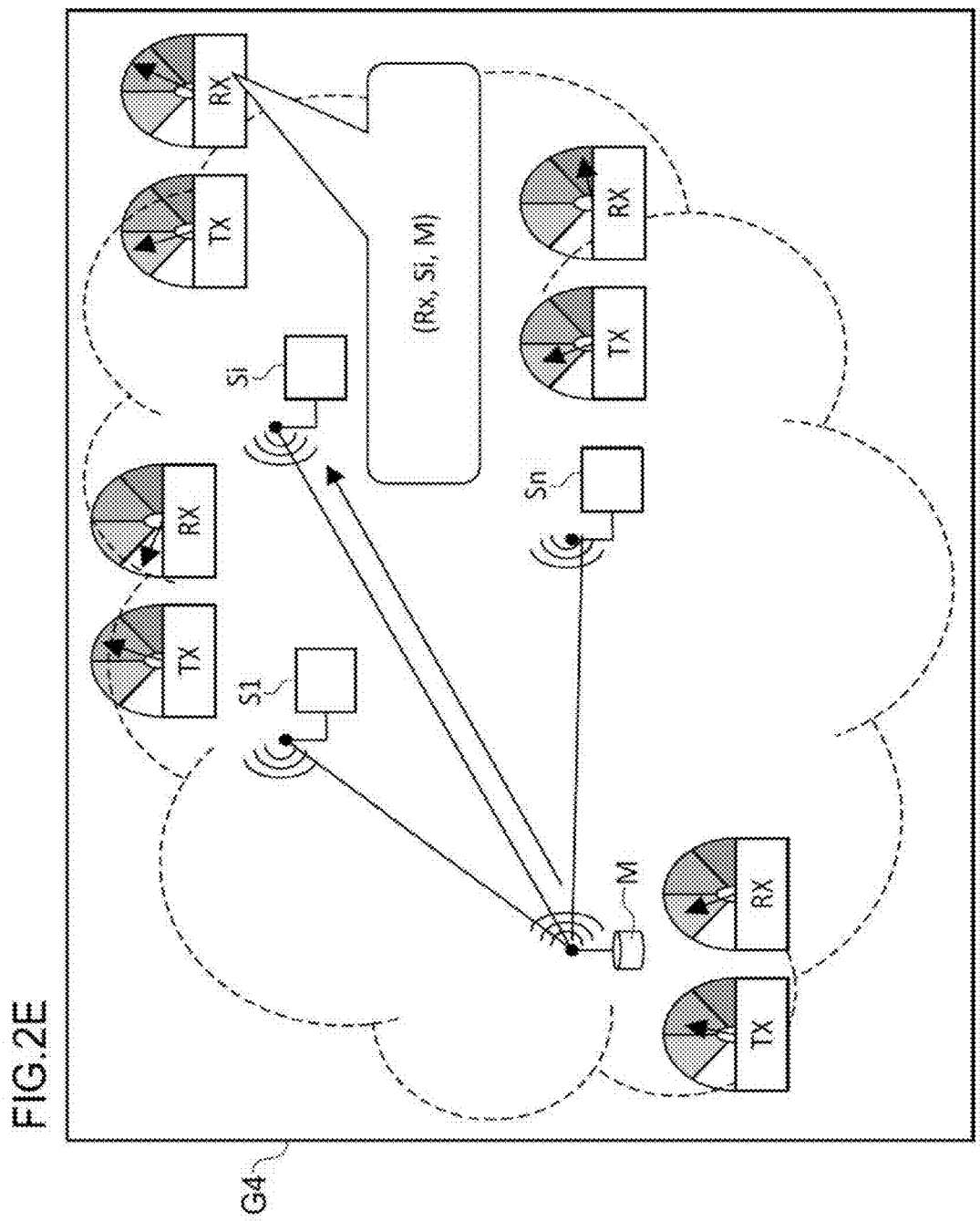

FIG. 1 represents in schematic fashion a system 1 for control of the power consumption of communications between electrical modules 30-34, 130-137 of an electrical infrastructure, according to one embodiment of the invention.

According to the invention, the control system 1 comprises a communication network 7, 107 and a processing circuit 9, 109 set up to regulate the power consumption for communication in the electrical infrastructure.

By electrical infrastructure is meant an electrical substation 135 or a set 105 of substations of an electricity production grid.

The present invention thus applies to an intra-substation communication network 7 (i.e. inside a substation 135) and/or to an inter-substation communication network 107 (i.e. between the substations 130-135).

Thus, the nodes of an intra-substation communication network 7 are formed by electrical equipment inside the substation 135 while the nodes of an inter-substation communication network 107 are formed by the substations 130-135 themselves. A node belonging to an intra-substation communication network 7 or to an inter-substation communication network 107 is called hereinafter, indiscriminately, an electrical module 30-34 (or 130-135).

According to the embodiment of the invention, the communication network 7 (or 107) is defined or constructed by a partitioning of the electrical modules 30-34 (or 130-135) between a central module, or master module 30 (or 130), and a set of slave modules 31-34 (or 131-135). The master module 30 (or 130) is set up to be connected to the slave modules 31-34 (or 131-135) by non-wireline communications links in a star pattern. Thus, one end of each link corresponds to the master module 30 (or 130) and the other end corresponds to a slave module belonging to the set of slave modules 31-34 (or 131-135).

Thus, according to one embodiment of the invention, the star-shaped communication network is an internal network 7 formed by the electrical equipment within the same substation 135. A central equipment unit among the electrical equipment is set up to play the role of the master module 30, while the other equipment units are set up to play the roles of the slave modules 31-34. As an example, the wireless communication within the substation 135 is advantageously of the Wifi type. In fact, a beacon or a router installed within the substation 135 plays the role of the master module 30 and the various electrical equipment units are outfitted originally or by add-on with Wifi sentinels (dongles) to play the roles of the slave modules 31-34.

According to another embodiment of the invention, the star-shaped communication network is an external network 107 formed by a set of electrical substations 130-135. A central substation 130, or command centre, is set up to play the role of the master module 130 while the other substations are set up to play the roles of the slave modules 131-135. The wireless communication between the substations 130-135 is advantageously of WiMax type. Furthermore, the inter-substation communication network 107 advantageously comprises repeaters 137 between the various substations.

In particular, a master module 30 in an internal communication network 7 within a substation 135 can be designated to play the role of a slave module in the external network 107 between the various substations 130-135. In this case, the master module of each substation brings together all the data received from the various slave modules of the substation and then itself becomes a slave module with regard to the command centre of the external communication network 107.

The processing circuit 9 (or 109) in an internal 7 or external 107 communication network is associated with the master module 30 (or 130) of the network and can be contained within the latter. In particular, the processing circuit 9 (or 109) usually comprises a processor 91 (or 191) and storage means 93 (or 193). The processing circuit 9 (or 109) is adapted to execute one or more computer programs containing program code instructions, stored in the storage means 93 (or 193) and designed to implement the method of the present invention. As a variant, the processing circuit 9 (or 109) can be a logic circuit installed in the master module.

For purposes of simplification, the master module in the following shall be designated by the reference M, the slave modules by the references S1, . . . , Si, . . . , Sn, the communication network by the reference 7 and the processing circuit by the reference 9.

According to a first embodiment of the invention, the processing circuit 9 is set up to regulate power levels of communications links at least in a direction of reception by the master module M from at least one slave module Si or (being a nonexclusive "or") by at least one slave module Si from the master module M. Preferably, the processing circuit 9 is set up to regulate the power levels of communications links at least in the direction of reception by the master module M from each slave module Si or (i.e., and/or) by each slave module Si from the master module M.

According to a second embodiment of the invention, the processing circuit 9 is set up to regulate power levels of communications links in a direction of transmission from the master module M to at least one slave module Si or (being a nonexclusive "or") by at least one slave module Si to the master module M. Preferably, the processing circuit 9 is set up to regulate the power levels of communications links in the direction of transmission from the master module M to each slave module Si or (i.e., and/or) from each slave module Si to the master module M.

By the power level of a communications link is meant the electric power consumed during a communication in a direction of reception or transmission through the communications link. Advantageously, the value of the power level can be defined as a function of the strength of the electric current flowing through the electrical module during the communication. In particular, the value of the power level can be designated by a ratio (between 0 and 1) or a percentage (between 0% and 100%) of the maximum electric current flowing through an electrical module 30-35 operating at full power.

Moreover, the regulation of the power level of a communications link in a defined direction (reception or transmission) involves the optimization or the minimization of the power consumption during a communication in the defined direction through this link.

Advantageously, the processing circuit 9 is set up to regulate the power levels of the communications links in one direction and/or in the other direction by implementing a generic algorithm modelling the different communications links.

In particular, the generic algorithm involves a modelling of communications links by ordered triplets. Each triplet is comprised of a first component, a second component and a third component (arranged in the designated order). The first component indicates the direction of the communications link selected from either the transmission direction Tx or the reception direction Rx. The second and third components indicate the starting point and arrival point of the communications link in the forward order or in the inverse order, depending on whether the direction of communication assigned by the first component is respectively a transmission Tx or a reception Rx. Thus, if the first component indicates a direction of transmission Tx then the second component indicates the starting point of the communication and the third component indicates the arrival point of the communication. In other words, if the first component indicates a direction of transmission Tx then the module which is the subject of the verb transmission is used as the second component, and the module which is the complement of the verb transmission as the third component. Thus, a transmission Tx through a communications link from a first module A to a second module B is designated by the triplet (Tx, A, B), that is, "A transmits to B".

On the other hand, if the first component indicates a direction of reception Rx, then the second component indicates the arrival point of the communication and the third component indicates the starting point of the communication. In other words, if the first component indicates a direction of reception Rx then the module which is the subject of the verb reception is used as the second component, and the module which is the complement of the verb reception as the third component. Here, the reception Rx of the communication by the second module B from the first module A is designated by the triplet (Rx, B, A), that is, "B receives from A".

FIGS. 2A-2E represent the global steps of a method for control of the power consumption of communications between electrical modules of an electrical infrastructure, according to a preferred embodiment of the invention.

FIG. 2A shows that, at the start (step G0), each electrical module (master M or slave S1, . . . , Si, . . . , Sn) is at its maximum power level E (i.e. 100%) in the direction of transmission Tx and reception Rx. The power levels of the electrical modules are symbolized in FIG. 2 by respective gauges. Of course, it is assumed that the communications are operational in the two directions Tx and Rx between the master module M and each slave module Si when the latter are at their maximum power level.

The first step G1 (FIG. 2B) involves the regulation of the power level of each communications link identified by a triplet (Tx, M, Si) having for its components: the direction of transmission Tx, the master module M, and one slave module Si from among the slave modules S1 to Sn. In other words, this first step involves the optimization of the power consumption during a communication in the direction of transmission from the master module M to each slave module Si. Of course, the regulation step is repeated for each slave module.

The second step G2 (FIG. 2C) involves the regulation of the power level of each communications link identified by a triplet (Rx, M, Si) having as its components: the direction of reception Rx, the master module M, and a slave module Si. This second step thus involves the regulation of the power levels in the direction of reception of the master module M from each slave module Si.

The third step G3 (FIG. 2D) involves the regulation of the power level of each communications link identified by a triplet (Tx, Si, M) having for its components: the direction of transmission Tx, a slave module Si, and the master module M. This third step thus involves the regulation of the power levels in the direction of transmission from each slave module Si to the master module M.

Finally, the fourth step G4 (FIG. 2E) involves the regulation of the power level of each communications link identified by a triplet (Rx, Si, M) having as its components: the direction of reception Rx, a slave module Si, and the master module M. This fourth step thus involves the regulation of the power levels in the direction of reception of each slave module Si from the master module M.

It will be noted that the sequencing order of the four steps may differ from that illustrated in FIGS. 2A-2E.

This method makes it possible to minimize the power consumption of communication in the electrical infrastructure as a whole and it can be executed at various times, such as after the initial installation, or after a first turning on or a later turning on, and it can be carried out after an electrical fault of short circuit type in the distribution network, or on demand such as during a peak in electricity consumption.

Furthermore, it will be noted that the optimization of the power consumption can be set up according to different possible strategies. For example, a first strategy which aims to optimize the master module or a second strategy which aims to optimize the slave modules or even a third strategy which aims to favour the least power-hungry modules may be selected (see FIG. 6).

Advantageously, each of the four steps G1-G4 makes use of the same generic process for regulation of the power level as a function of triplets modelling the various communications links.

Figure 3:
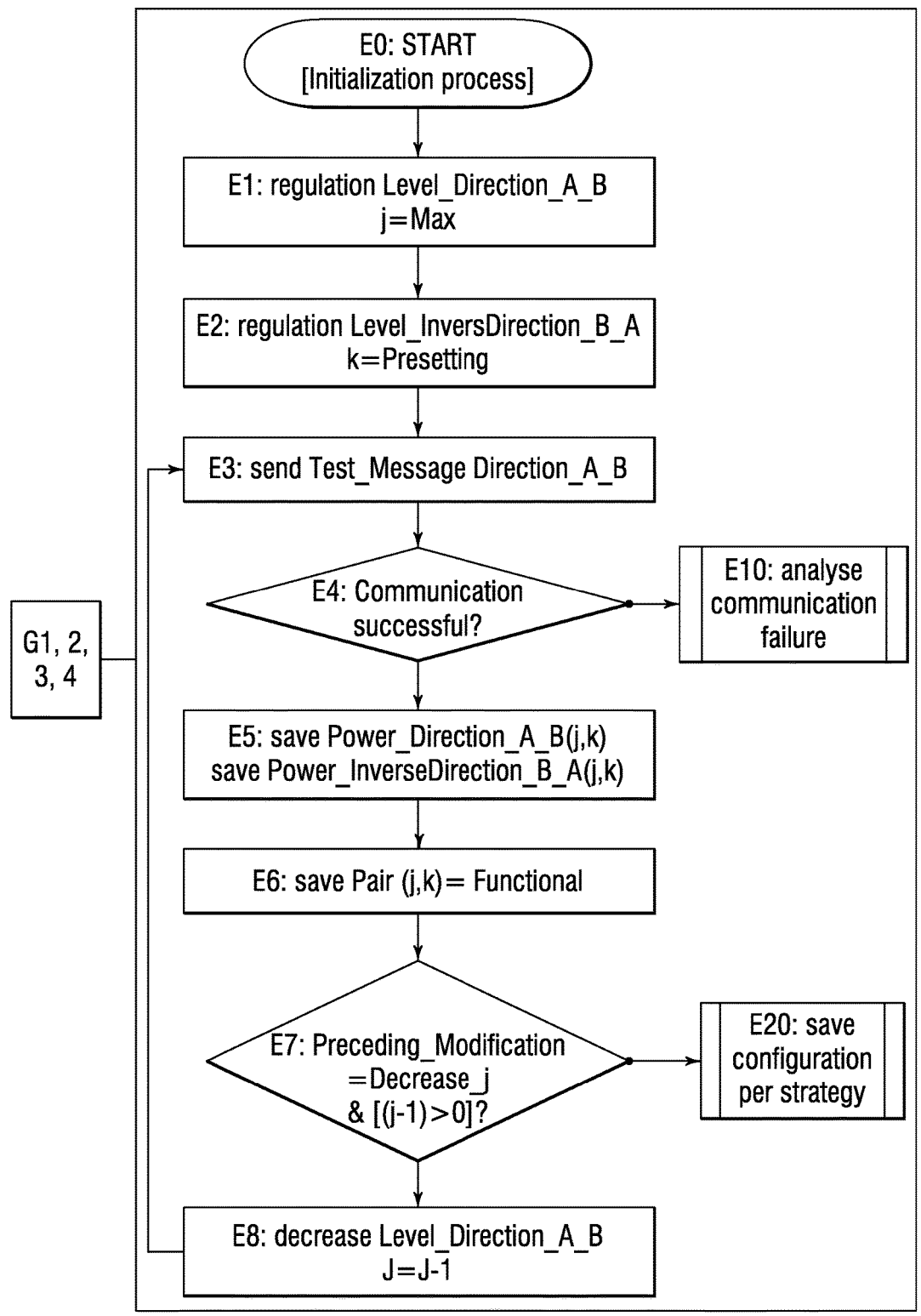
FIG. 3 is a flow chart illustrating the steps of a generic process of regulation of the power level, according to a preferred embodiment of the invention.

In fact, FIG. 3 is a flow chart illustrating the steps of a generic process of regulation of the power level, according to a preferred embodiment of the invention.

Figure 4:
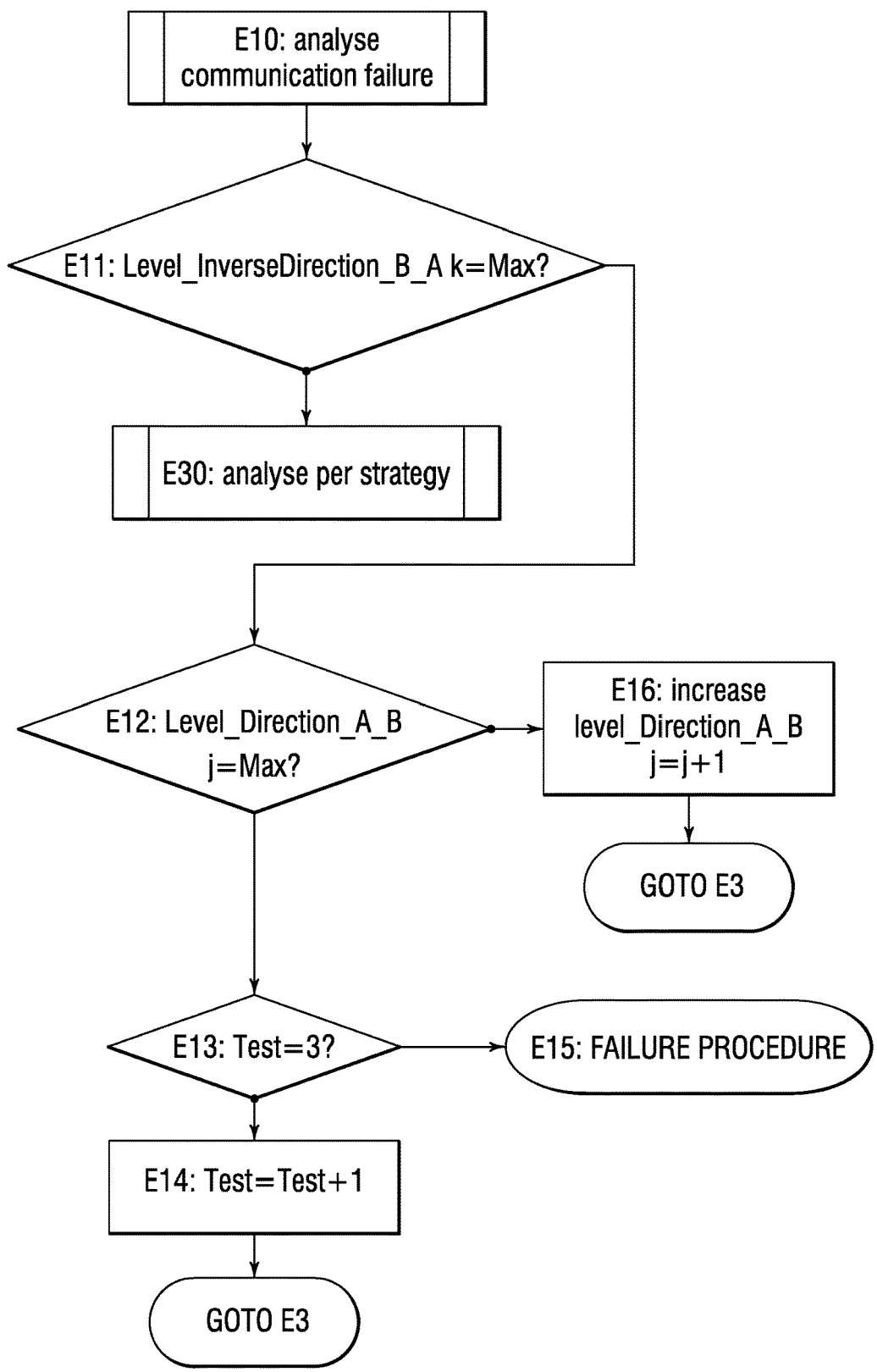
FIG. 4 is a flow chart illustrating the steps of a sub-process of failure analysis of a communication, according to a preferred embodiment of the invention.
Figure 5:
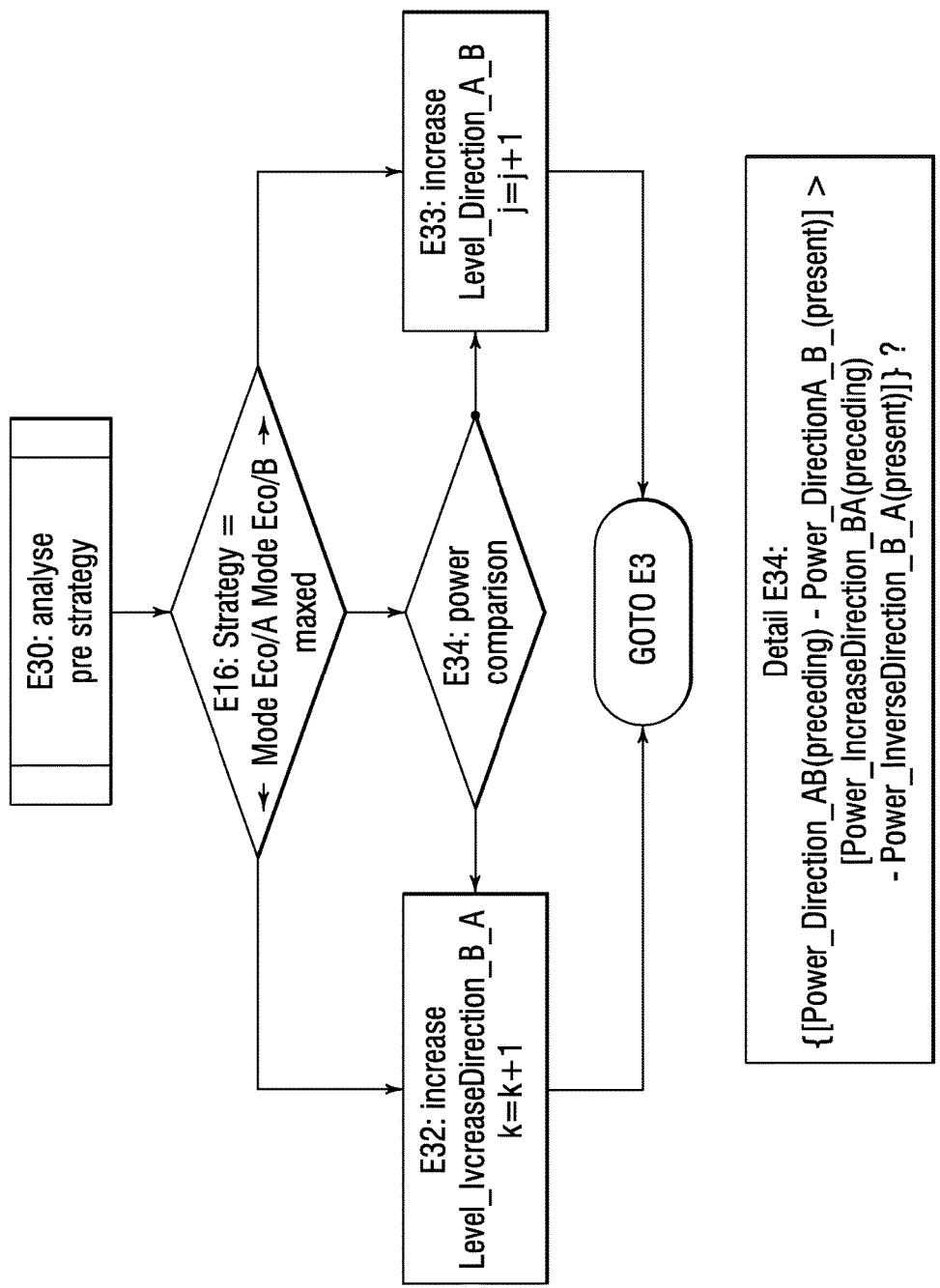
FIG. 5 is a flow chart illustrating the steps of a sub-process of analysis and actions to be taken according to the strategy chosen after failure of a communication, according to a preferred embodiment of the invention.
Figure 6:
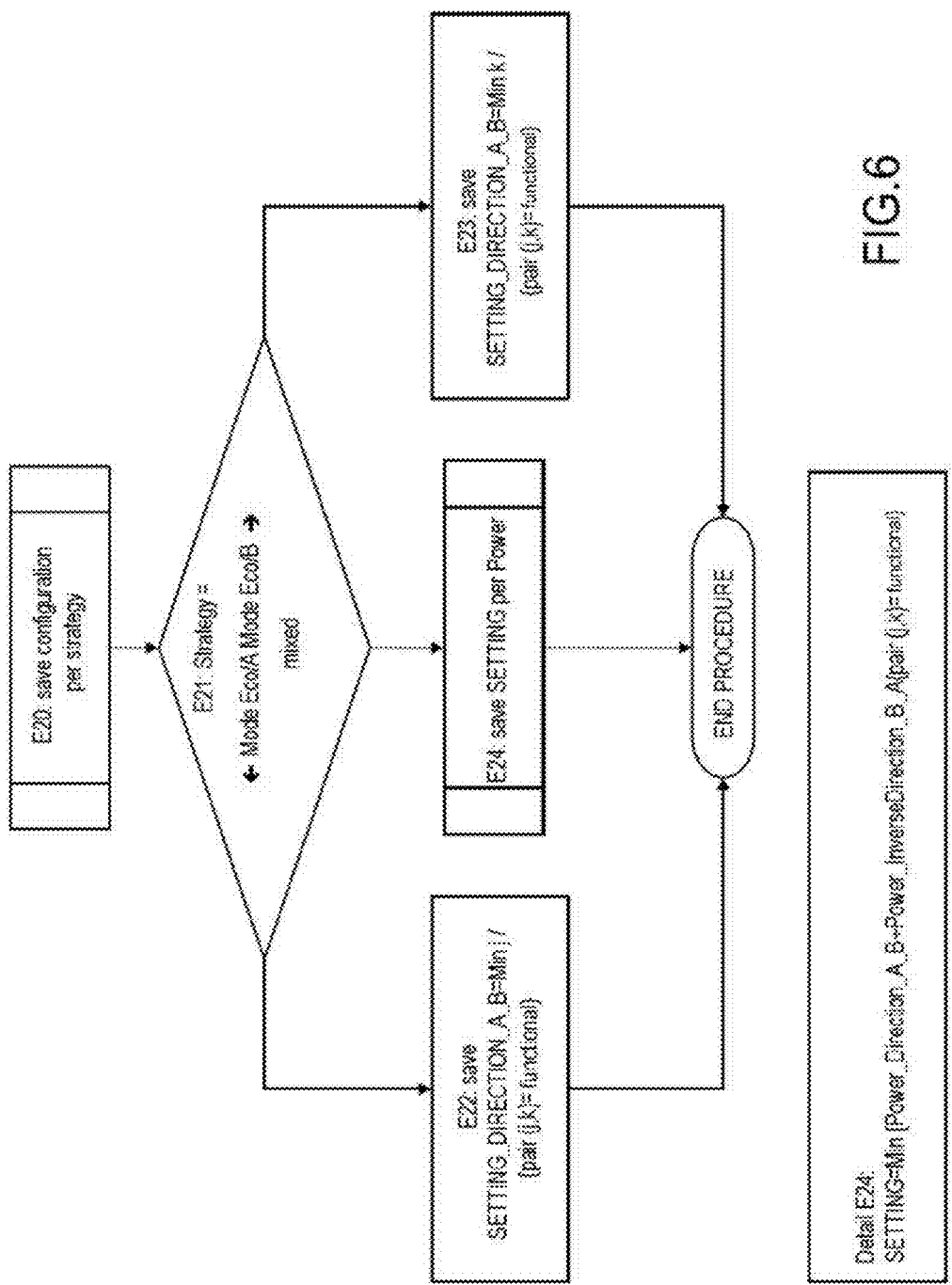
FIG. 6 is a flow chart illustrating the steps of a sub-process of saving a power consumption configuration according to several strategies, according to a preferred embodiment of the invention.

The processing circuit 9 is set up to realize the various steps of the generic process of FIG. 3 as well as the steps of the sub-processes which result from this generic process and which are described by FIGS. 4-6.

In this flow chart, a generic communications link identified in general manner by a triplet (DIRECTION, A, B), or first triplet, having as its components a first direction "DIRECTION" of the communications link is considered to be a first electrical module "A", and a second electrical module "B". The second module "B" corresponds to a slave module "Si" if the first module "A" is a master module "M", and vice versa.

This flow chart uses certain parameters including the first direction "DIRECTION" of the communication, the opposite direction "INVERSE DIRECTION" of the first direction, and first and second values "j" and "k" for regulation of power levels. The current values of j and k are either percentages between 0% and 100% of the maximum current with a counting step, for example, of 10%, or values between 0 and 1, with a step of 0.1.

Other parameters or variables comprising a counter of communication trials "Test" in regard to the first triplet, a modification indicator "Previous_Modification", first and second matrices of first and second values of consumed power levels in one direction and in the opposite direction, respectively, as well as a third matrix whose coefficients indicate in binary form the functional pairs (j,k) (i.e. the pairs (j,k) which guarantee a functional communication between the first module A and the second module B) are also used.

More particularly, the first and second matrices are used to memorize the consumed powers (respectively in each direction of communication) and they have dimensions which correspond to the respective values which can be taken by the regulation values j and k. Thus, for example, if j is regulated at five values and k is regulated at four values, each of the two first and second matrices is of dimension 5×4 (i.e. five rows and four columns, j and k being the indices of each of the matrices), and the same is true of the third matrix.

Step E0 is an initialization of certain variables including:
Test=1,
Preceding_Modification=Decrease_j
matrix of functional pairs (j,k)=[[0]],
matrix Power_Direction_A_B=[[0]]
matrix Power_InverseDirection_B_A=[[0]].

In step E1, we regulate the first regulation value of the power level j with regard to the first triplet (DIRECTION, A, B) to its maximum (i.e. j=1). The next steps have the purpose of decreasing this first power regulation level value j so as to guarantee that the communications link as defined by the first triplet (DIRECTION, A, B) is organized so as to consume the least possible power while remaining in harmony with the power strategy choice adopted.

In step E2, we define a second triplet (INVERSE DIRECTION, B, A) having as its first component a second direction "INVERSE DIRECTION" of the communications link opposite to said first direction "DIRECTION", as its second component the second electrical module B, and as its third component the first electrical module A. The second power level regulation value k with regard to the second triplet is regulated at its current preregulation value (Presetting).

This preregulation value corresponds either to the maximum value of k (i.e. k=1) or to a regulation previously established by the generic flow chart.

In fact, during each of the global steps G1-G4 of the method of FIGS. 2A-2E we only consider a single direction of communication. The opposite direction is either at its maximum level, since it has not yet been regulated, or it has already been regulated in a previous major step (G1-G4).

In steps E3-E8, we check in iteration fashion the operational state of the communications link as a function of the first and second current values for regulation of power levels j and k, decrementing during each iteration (with steps of 0.1) a counter associated with the first current regulation value j with regard to the first triplet (DIRECTION, A, B). Of course, the counter is started at the maximum value of the first regulation value j for the power level as defined in step E1 (i.e., j=1).

More particularly, in step E3 we send a message of "Communication Test" in the DIRECTION of communication between the first module A and the second module B according to the first triplet (DIRECTION, A, B). For example, if DIRECTION=Tx, the first module A will transmit a message to the second module B, composed of a series of random bits, such as {1001011010}.

In step E4, we test whether the communication in the DIRECTION of the first module A to the second module B was successful or not. In the previous example, the transmission Tx from A to B of the message is validated by the acknowledgement of a reception Rx by B from A, for example by communicating the frame which is complementary to that generated randomly in step E3 (i.e. {0110100101} in the example of step E3). If the communication with regard to the first triplet (DIRECTION, A, B) has failed, we enter into a sub-process E10 which will analyse the cause of the failure. Otherwise, that is if the communication was successful, we continue with the next step E5.

In step E5, the first and second current regulation values j and k of the power levels are considered to be operational. We then save the first current regulation value j of the power level with regard to the first triplet (DIRECTION, A, B) as well as the second current regulation value k of the power level with regard to the second triplet (INVERSE DIRECTION, B, A).

In fact, in step E5 we consider that the steps E3 and E4 were both successful. This means that the pair (j,k) of first and second current regulation values of power levels between the modules A and B makes it possible to ensure this communication. We then save in the first matrix the value of the current strength consumed in step E3, representing the power level required during the communication associated with the first triplet (DIRECTION, A, B) on the row and column corresponding respectively to the pair (j, k). For example, a pair (j, k)=(0.3; 0.5) corresponds to the coordinates (3, 5) of the first matrix. In the second matrix, we save the value of the current strength consumed in step E4, representing the power level required during the communication associated with the second triplet (INVERSE DIRECTION, B, A) on the row and column corresponding respectively to the pair (j, k).

In step E6, we save as the index element (j, k) of the third matrix the fact that the pair of regulation values (j,k) of power levels is operational (i.e. (j,k)=1) with regard to the first triplet (DIRECTION, A, B). This functional regulation pair indicates the power levels which are able to ensure the communication between the first and second modules. Thus, in iteration fashion, this step allows us to save a set of functional regulation pairs (j, k) with regard to the first triplet (DIRECTION, A, B).

Step E7 consists in making two verifications. In the first verification, we test whether the preceding modification of the regulation was able to decrease the first current regulation value j (i.e. Preceding_Modification=Decrease_j), in order to determine whether it is justified to continue to decrease this value to attempt to lower consumption. The second verification consists in verifying that the first current regulation value j is not at its minimum (if j is at its minimum, further decreasing its value would result in abolishing the communication with regard to the first triplet (DIRECTION, A, B)). If this is not so (i.e. if the first and second verifications are both negative), this means that we have achieved a necessary and sufficient regulation configuration to ensure the communication while still minimizing its consumption, and we then enter into a sub-process E20 of saving the configuration. Otherwise, we continue with the next step E8.

In step E8, we decrement the first current regulation value j with regard to the first triplet (DIRECTION, A, B) by a step of 0.1 and return to step E3. We maintain the statement that the preceding modification of the regulation resulted in decreasing the first current regulation value j (i.e. Preceding_Modification=Decrease_j).

FIG. 4 is a flow chart illustrating the steps of a sub-process of failure analysis of a communication, according to a preferred embodiment of the invention.

This sub-process takes place when in step E4 of FIG. 3 the communication diagnostics detected a failure. The purpose of the sub-process is to analyse the reason for the failure and to propose various possible restorative actions.

Step E10 is the entry into the analysis sub-process during the failure of a communication at the exit from step E3.

In step E11, we test whether the communication failed because the second regulation value of the power level k with regard to the second triplet (INVERSE DIRECTION, B, A) was not at its maximum level. (In other words, we test whether the communication was considered unsuccessful because the return communication did not occur for lack of a sufficient regulation). If this is so, that is, if the return communication was not at its maximum level, we enter into a sub-process E30 of analysis of the failure in dependence on the strategy selected. Otherwise, we go on to the next step E12.

In step E12, the second regulation value of the power level k with regard to the second triplet (i.e. the return communication) being regulated to its maximum, we test whether the first regulation value of the power level j with regard to the first triplet (i.e. the outgoing communication) was also at its maximum level during the failure. If this is so, we go on to step E13, otherwise we go on to step E16.

Step E13 involves the rather improbable case when the communication failed despite the fact that the first j and second k power level regulation values were at their respective maximum. In principle, the communications between the first and second modules in the two directions should operate normally when the values j and k are at their maximum power level. The failure might possibly be due to a disruption during the communication attempt and we then make a predetermined number m (for example m=3) of iteration trials to verify whether this is the case. More particularly, we verify during this step E13 the number of trials already attempted, tolerating m−1 consecutive failed trials. If there have been m consecutive failures, we go on to step E15, otherwise we go on to step E14.

In step E14, we increment the counter of the number of trials "Test" with regard to the first triplet (DIRECTION, A, B) and return to step E3 of the flow chart of FIG. 3 to again commence the communication tests.

In step E15 the process of counting the number of trials is halted because m communication attempts (with regard to the first triplet (DIRECTION, A, B) with the first and second regulation values j and k at maximum) have failed. In this case, the operator may then be asked to verify the installation to locate the origin of the disruption and begin the general process over again.

Moreover, in step E16 the communication failed even though the second regulation value k of the power level with regard to the second triplet (INVERSE DIRECTION, B, A) was at maximum, but not the first regulation value j of the power level with regard to the first triplet (DIRECTION, A, B). We then increment the first current regulation value j. We save in memory the fact that the preceding modification involved "increase_j", and we return to step E3 of the flow chart of FIG. 3 to recommence the communication tests.

FIG. 5 is a flow chart illustrating the steps of a sub-process of analysis and actions to be taken according to the strategy chosen after failure of a communication, according to a preferred embodiment of the invention.

This sub-process takes place when in step E4 of FIG. 3 the communication has failed while the second power level regulation value k with regard to the second triplet (INVERSE DIRECTION, B, A) was not at its maximum level (see step E11 of FIG. 4).

Step E30 is an entry into the analysis sub-process for the strategy from step E11 of FIG. 4.

As an example, let us assume that we have had a failure of communication with regard to a communications link as defined by the triplet (Tx, A, B) with a pair (j, k)=(0.3; 0.5). That is, we have had a failure with 30% of the maximum level for the transmission from A to B and 50% of the maximum level for the reception from B to A.

In step E31, we test whether the strategy selected is designed to optimize the consumption of the first module A, in which case we move on to step E32, or to optimize the consumption of the second module B, in which case we move on to step E33, or whether it involves a mixed strategy for the first and second modules A and B, in which case we move on to step E34.

In step E32, given that the strategy adopted prefers to economize on the consumption of the first module A, we then increment the second regulation value k of the power level with regard to the second triplet (INVERSE DIRECTION, B, A). In the example described above in step E31, the pair (j, k) becomes (0.3; 0.6), that is, we increase the level of reception of the second module B to 60% of the maximum level while maintaining at 30% the transmission of the first module A to the second module B.

In step E33, given that the strategy adopted prefers to economize on the consumption of the second module B, we then increment the first regulation value j of the power level with regard to the first triplet (DIRECTION, A, B). We then save in memory the fact that the preceding modification involved "increase_j", and then we return to step E3 of the flow chart of FIG. 3 to recommence the communication tests.

In this case, and according to the example described in step E31, the pair (j, k) becomes (0.4; 0.5), that is, we increase the level of transmission from A to B to 40% of the maximum level while maintaining at 50% the reception of the second module B. In fact, the second module B can be a slave module powered by a small battery which we prefer to maintain.

Step E34 is a test to verify which is the least power-hungry in the case of a mixed strategy.

In other words, we verify whether we need to return to the preceding operational regulation to increment the first regulation value j or to increment the second regulation value k. Thus, we try to identify which is overall the most detrimental of these two alternatives in order to choose the one which is the least power-hungry. In particular, we compare the difference in the power consumed during the last two iterations (preceding one and current one) with regard to the first triplet (DIRECTION, A, B) and the difference in the power consumed during the last two iterations with regard to the second triplet (INVERSE DIRECTION, B, A). Depending on which is the most advantageous, we then move on to step E32 or to step E33.

According to the example described in step E31, the processing circuit is set up to compare (for example, by the counters provided or by requesting measurements of the current flow rates) the consumptions of (j, k)=(0.3; 0.6) and (j, k)=(0.4; 0.5) in order to select the lowest consumption.

FIG. 6 is a flow chart illustrating the steps of a sub-process of saving a power consumption configuration according to several strategies, according to a preferred embodiment of the invention.

This sub-process is designed to adopt the optimal pair (j,k) as a function of a selected strategy after having determined all the operational regulation pairs (j, k) with regard to the first triplet (DIRECTION, A, B) in step E6 of FIG. 3.

In fact, step E20 is an entry point of this memorization sub-process from step E7 of FIG. 3.

In step E21, we test whether the strategy is designed to optimize the consumption of the first module A, in which case we move on to step E22, or to optimize the consumption of the second module B, in which case we move on to step E23, or whether it involves a mixed strategy for the first and second modules A and B, in which case we move on to step E24.

In step E22, since the strategy adopted is to economize on the consumption of the first module A, we then search among the functional pairs (j,k) for the one which has the smallest regulation value j, which we will save in the storage means as being the optimal configuration (SETTING). This ends the generic process for the first triplet (DIRECTION, A, B).

In step E23, since the strategy adopted is to economize on the consumption of the second module B, we then search among the functional pairs (j,k) for the one which has the smallest regulation value k, which we will save in the storage means as being the optimal configuration. This ends the generic process for the first triplet (DIRECTION, A, B).

Step E24 involves the case of a mixed strategy. We then adopt the one which is the least power-hungry by searching among the functional pairs (j,k) for those which minimize the sum of the power consumptions with regard to the first triplet (DIRECTION, A, B) and second triplet (INVERSE DIRECTION, B, A). In other words, the processing unit 9 calculates the minimum of the sum of the power consumed in the first "DIRECTION" between the modules A and B and in the opposite direction "INVERSE DIRECTION" between the modules B and A. We have then finished the generic process for the first triplet (DIRECTION, A, B).

Once all the electrical modules (master module M and slave modules S1, . . . Sn) of an architecture have gone through the global process, the user then knows the optimal communication configuration for minimum power consumption. He can then choose to operate his architecture in this minimal configuration permanently, or only to resort to it in certain critical cases.

According to one embodiment of the invention, the electrical modules are set up to operate most of the time in a "normal" operating mode, disregarding the constraint of power consumption and only switching to "optimal" mode in a "critical" or degraded situation. In "normal" mode, the master and slave modules have their respective levels of transmission and reception regulated to their maximum. On the other hand, in "optimal" mode, the master and slave modules have their respective levels of transmission and reception regulated to their strict minimum.

This makes it possible to reduce the power consumptions with regard to communications when that is deemed to be necessary. For example, this might correspond to a situation where the electrical infrastructure is under a power constraint. For example, during an electrical outage (blackout), the electrical modules are set up to operate on an auxiliary group or on their own batteries. However, not knowing in advance the duration of the event, it may be judicious to try to economize on the power resources of the electrical infrastructure by limiting its levels of communication between the modules to what is strictly necessary. This can be achieved by temporarily switching the levels of transmission and reception of the master module and the slave modules to the minimal levels while awaiting the end of the outage in order to return to a normal operation.

Furthermore, it may be advantageous to take certain actions within the electrical infrastructure on a priority basis. For example, the opening or closing of a switch of the electricity network to carry out a reconfiguration of the network or to isolate a faulty section (bypassing in the network) is a priority action with respect to an exchange of monitoring data between equipment units, which could be done on a deferred basis. Now, to guarantee the proper performance of these actions, it is preferable to guarantee the proper supply of power to these priority actions, and thus to minimize the non-priority consumptions of communications according to the control method of the invention. This can be done by operating the control method for the time necessary for the proper execution of these actions, before returning to a normal operation.

Figure 7:
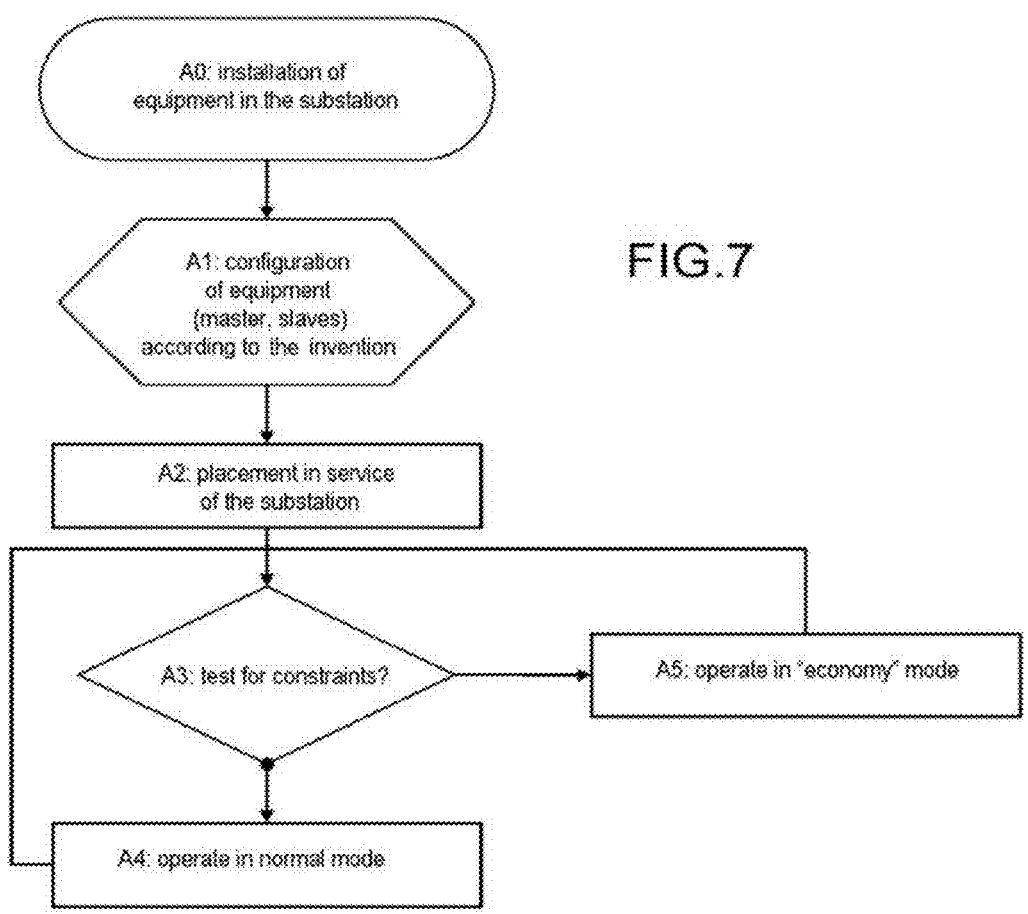
FIG. 7 is a flow chart illustrating the steps of a process of control of the power consumption in critical situations, according to a preferred embodiment of the invention.

In fact, FIG. 7 is a flow chart illustrating the steps of a process of control of the power consumption in critical situations, according to a preferred embodiment of the invention.

In step A0, the electrical modules (master module and slave modules) in the electrical infrastructure (substation or set of substations) are initialized.

Step A1 consists in preparing the optimal configuration of transmission and reception for the different modules according to the processes of FIGS. 2A to 6.

Step A2 involves the effective placement of the electrical infrastructure in service.

Step A3 is a test for constraints. In fact, we test in this area whether a constraint exists (momentary interruption of the electrical infrastructure of blackout type, priority bypass request, etc.), necessitating a switching of the communications to the energy "economy" mode.

In step A4, if no specific constraint exists, or does not exist any longer, we remain in or return to "normal" operating mode, with the levels of communication (transmission and reception) of the modules (master and slaves) at their respective maximum.

On the other hand, in step A5, if a specific constraint exists or persists, we switch to or remain in a so-called "economy" operating mode, where the levels of communication (transmission and reception) of the modules (master and slaves) are regulated by the optimal configuration determined in step A1.

Advantageously, the processing circuit is set up to switch the master module and the slave modules to "optimal" mode for the reception of a trigger signal generated by a predetermined critical event. The switching in the other direction can be triggered at the end of the critical event.

Figure 8:
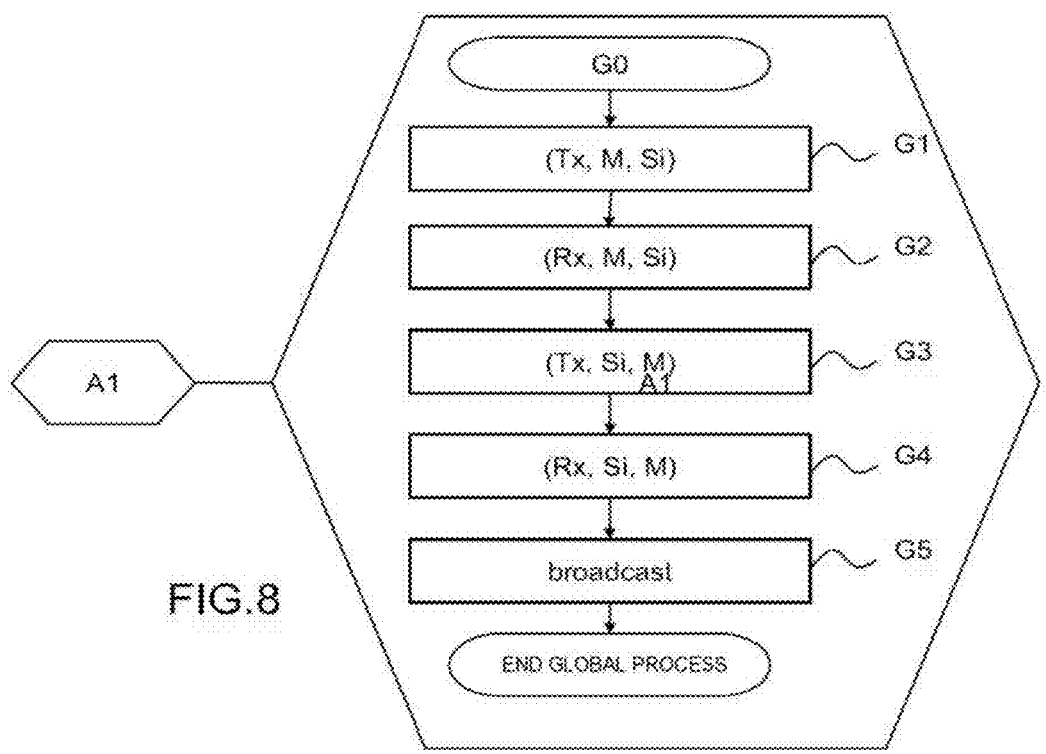
FIG. 8 represents in schematic fashion the global steps of a method for control of the power consumption of communications between electrical modules in broadcast mode, according to another preferred embodiment of the invention.

FIG. 8 represents in schematic fashion the global steps of a method for control of the power consumption of communications between electrical modules in broadcast mode, according to another preferred embodiment of the invention.

Steps G1 to G4 are identical to those of FIGS. 2A-2E and thus make it possible to determine the configuration of communication at minimum power consumption. Each of the steps G1 to G4 makes it possible to determine, for each designated triplet, its communication configuration at minimum consumption by applying the generic process described by FIGS. 3 to 6.

Step G5 is optional and can be put into effect in event of checking the power consumption of communications between electrical modules in broadcast mode. In this case, we select from among the functional pairs associated with the communications links the maximum level of transmission from the master to each of the slaves, as well as the maximum level of reception of the master from each of the slaves. In fact, once we have determined in steps G1 to G4 the operational power levels for reception of each slave module as well as the operational power level for transmission of the master module, we can easily select a single functional pair which enables regulation of the master module as well as all the slave modules in a general and no longer an individual manner.

In the case where only the master module has possibilities of regulation, steps G3 and G4 can be eliminated. By contrast, in the case where only the slave modules have possibilities of regulation, steps G1 and G2 can be eliminated.

The invention claimed is:

1. A method of control of power consumption of communications between nodes of an intra-substation or an inter-substations communication network of an electrical infrastructure, the nodes of an intra-substation communication network being formed by electrical equipment within the substation, the nodes of an inter-substations communication network being formed by the substations themselves, a node belonging to an intra-substation or an inter-substations communication network being called an electrical module, the method comprising:
   defining a star-shaped communication network by partitioning the electrical modules between a central, master module and a set of slave modules, the master module being configured to be connected to the slave modules by non-wireline communications links in star pattern, and
   minimizing power consumed during communication via communication links by regulating power levels of the communications links at least in a direction of reception by the master module from at least one slave module or by at least one slave module from the master module, said regulation of the power levels being processed according to a generic process modelling the communications links.

2. The method according to claim 1, further comprising regulating the power levels of communications links in a direction of transmission from the master module to at least one slave module or from at least one slave module to the master module.

3. The method according to claim 2, comprising:
regulating the power levels in the direction of transmission from the master module to each slave module,
regulating the power levels in the direction of reception of the master module from each slave module,
regulating the power levels in the direction of transmission from each slave module to the master module, and
regulating the power levels in the direction of reception of each slave module from the master module.

4. The method according to claim 1, comprising a modelling of communications links by ordered triplets each comprised of a first component indicating a direction of the communications link, and second and third components indicating a starting point and arrival point of the communications link in a forward order or in an inverse order according to whether the direction of communication assigned by the first component is respectively a transmission or a reception.

5. The method according to claim 4, wherein the regulation of the power level of a generic communications link identified by a first triplet having for its components a first direction of the communications link, a first electrical module, and a second electrical module, is realized according to a generic process comprising:
defining a second triplet having as its first component a second direction of the communications link opposite said first direction, as its second component said second electrical module, and as its third component said first electrical module,
iteratively testing an operating state of the communications link as a function of the first and second current values of regulation of power levels pertaining respectively to said first and second triplets while decrementing for each iteration a counter associated with the current value of regulation pertaining to the first triplet, said counter being initialized at a maximum power level value,
saving the first and second current values of regulation of operational power levels, and
saving a set of functional regulation pairs pertaining to the first triplet, each current pair of functional regulation being composed of said first and second current values of regulation of operational power levels.

6. The method according to claim 5, comprising saving a power consumption configuration according to a power consumption optimization strategy for the first module or the second module or a least power-hungry of said first and second modules.

7. The method according to claim 5, comprising performing a failure analysis of a communication in the event of a malfunctioning of the communications link.

8. The method according to claim 5, comprising performing a regulation in broadcast mode comprising selecting, from among the functional pairs associated with the communications links, a maximum level of transmission from the master module to each of the slave modules, as well as a maximum level of reception of the master module from each of the slave modules.

9. The method according to claim 1, wherein the control of power consumption of said master module and said slave modules is carried out after a predetermined event or during a critical situation.

10. A system of control of power consumption of communications between electrical modules of an electrical infrastructure, comprising:
a star-shaped communication network between a central, master module and a set of slave modules, the master module being configured to be connected to the slave modules by non-wireline communications links in a star pattern, and
a processing circuit configured to implement the control method according to claim 1.

11. The system according to claim 10, wherein the star-shaped communication network is an internal network composed of equipment within the same substation among which a central equipment unit is configured to be the master module while the other equipment units are configured to be the slave modules.

12. The system according to claim 10, wherein the star-shaped communication network is an external network including a set of electrical substations among which a central substation, or command centre, is configured to be the master module while the other substations are configured to be the slave modules.

13. An electrical infrastructure comprising the system according to claim 10.

* * * * *